United States Patent
Jurs

(10) Patent No.: US 10,368,554 B2
(45) Date of Patent: Aug. 6, 2019

(54) APPARATUS FOR CUTTING FREE THE FLANK BONES OF DECAPITATED, SLAUGHTERED FISH WITH OPENED ABDOMINAL CAVITIES, AS WELL AS FILLETING MACHINE HAVING A DEVICE OF THIS TYPE

(71) Applicant: Nordischer Maschinenbau Rud. Baader GmbH + Co. KG, Lubeck (DE)

(72) Inventor: Michael Jurs, Neustadt (DE)

(73) Assignee: Nordischer Maschinenbau Rud. BAADER GmbH + CO. KG, Lubeck (DE)

( * ) Notice: Subject to any disclaimer, the term of this patent is extended or adjusted under 35 U.S.C. 154(b) by 0 days.

(21) Appl. No.: 15/534,943

(22) PCT Filed: Nov. 23, 2015

(86) PCT No.: PCT/EP2015/077353
§ 371 (c)(1),
(2) Date: Jun. 9, 2017

(87) PCT Pub. No.: WO2016/091572
PCT Pub. Date: Jun. 16, 2016

(65) Prior Publication Data
US 2018/0263250 A1    Sep. 20, 2018

(30) Foreign Application Priority Data
Dec. 10, 2014  (DE) .................. 10 2014 118 327

(51) Int. Cl.
*A22C 25/16* (2006.01)
*A22C 17/00* (2006.01)
*A22C 17/04* (2006.01)

(52) U.S. Cl.
CPC ............ *A22C 25/16* (2013.01); *A22C 17/004* (2013.01); *A22C 17/04* (2013.01)

(58) Field of Classification Search
CPC ........ A22C 25/16; A22C 25/00; A22C 25/145; A22C 25/166
(Continued)

(56) References Cited

U.S. PATENT DOCUMENTS 3,241,179 A    3/1966   Schlichting
4,507,824 A    4/1985   Sawusch
(Continued)

FOREIGN PATENT DOCUMENTS

CL    00162-2013 A1    1/2013
DE    2747386 A1    4/1978
(Continued)

OTHER PUBLICATIONS

International Preliminary Report on Patentability dated Jun. 13, 2017 from International Patent Application No. PCT/EP2015/077353.
(Continued)

*Primary Examiner* — Richard T Price, Jr.
(74) *Attorney, Agent, or Firm* — David B. Tingey; Bryant J. Keller; Kirton McConkie

(57) ABSTRACT

The invention relates to an apparatus for cutting free the flank bones of decapitated, slaughtered fish with opened abdominal cavities which are transported on transport saddles as supporting bodies for securely receiving the fish in their abdominal cavities, comprising an upper bones guide, a lower bones guide and a separating assembly for releasing fish fillets from the flank bones, wherein the separating assembly, which can be brought from a standby position into a working position and vice versa, comprises a separating device having cutting edges and with a corre-
(Continued)

Figure 1:
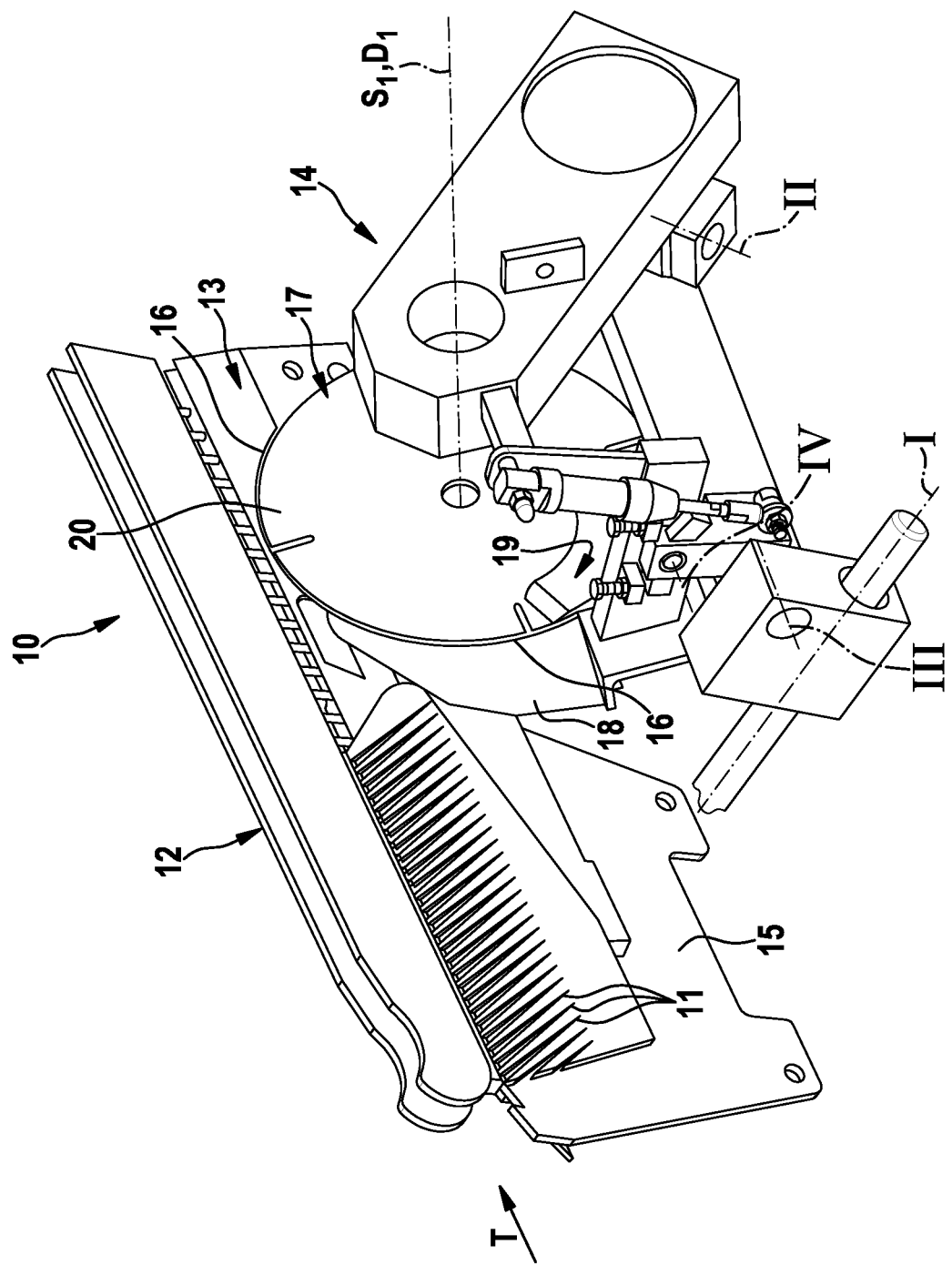

sponding counter-surface, which is characterized in that a covering element, for covering regions of the cutting edge of the separating device located in the effective region of the separating device inside the fish, is assigned to the separating device, and the covering element is designed and configured such that it can be automatically adjusted with respect to its position in relation to the separating device. The invention further relates to a filleting machine with such an apparatus.

10 Claims, 3 Drawing Sheets

(58) Field of Classification Search
USPC ......... 452/135, 136, 149–153, 160–162, 170
See application file for complete search history.

(56) References Cited

U.S. PATENT DOCUMENTS

| | | | | |
|---|---|---|---|---|
| 5,106,335 A * | 4/1992 | Behnk | ............ | A22C 25/16 452/151 |
| 5,536,205 A * | 7/1996 | Braeger | ............ | A22C 25/16 452/136 |
| 6,200,211 B1 * | 3/2001 | Braeger | ............ | A22C 25/16 452/161 |
| 7,090,574 B2 * | 8/2006 | Braeger | ............ | A22C 25/16 452/161 |
| 7,927,194 B2 * | 4/2011 | Jurs | ............ | A22C 25/16 452/135 |
| 8,272,928 B2 * | 9/2012 | Finke | ............ | A22C 25/16 452/161 |
| 8,298,050 B2 * | 10/2012 | Jurs | ............ | A22C 25/16 452/162 |
| 8,814,637 B2 * | 8/2014 | Jurs | ............ | A22C 25/16 452/162 |
| 8,956,205 B2 * | 2/2015 | Kowalski | ............ | A22C 25/16 452/135 |
| 9,532,582 B2 | 1/2017 | Jurs et al. | | |
| 2004/0253915 A1 | 12/2004 | Braeger et al. | | |
| 2010/0255767 A1 | 10/2010 | Jurs et al. | | |
| 2011/0111681 A1 | 5/2011 | Finke et al. | | |
| 2012/0149290 A1 * | 6/2012 | Jurs | ............ | A22C 25/16 452/162 |
| 2013/0035023 A1 * | 2/2013 | Jurs | ............ | A22C 25/16 452/162 |
| 2013/0210328 A1 | 8/2013 | Vigre | | |
| 2016/0073647 A1 | 3/2016 | Jurs et al. | | |

FOREIGN PATENT DOCUMENTS

| | | |
|---|---|---|
| DE | 3206274 A1 | 9/1983 |
| DE | 102013103995 B3 | 4/2014 |
| EP | 2224816 | 5/2009 |
| WO | 02/03807 A1 | 1/2002 |
| WO | 2009059759 A1 | 5/2009 |

OTHER PUBLICATIONS

Examination Report dated Jun. 20, 2018 from from Chilean Patent Application No. 01403-2017.
International Search Report dated Feb. 12, 2016 from International Patent Application No. PCT/EP2015/077353.

* cited by examiner

APPARATUS FOR CUTTING FREE THE FLANK BONES OF DECAPITATED, SLAUGHTERED FISH WITH OPENED ABDOMINAL CAVITIES, AS WELL AS FILLETING MACHINE HAVING A DEVICE OF THIS TYPE

The invention relates to an apparatus for cutting free the flank bones of decapitated, slaughtered fish with opened abdominal cavities which are transported on transport saddles as supporting bodies for securely receiving the fish in their abdominal cavities, comprising an upper bone guide, a lower bone guide and a separating assembly for releasing fish fillets from the flank bones, wherein the separating assembly, which can be brought from a standby position into a working position and vice versa, comprises a separating means having cutting edges and with a corresponding counter-surface.

Furthermore, the invention relates to a filleting machine for filleting decapitated, slaughtered fish with opened abdominal cavities, comprising dorsal knives for exposing the dorsal spokes up to the spine, ventral knives for exposing the ventral spokes up to the spine in the tail region, an apparatus for cutting free the flank bones, separating knives for separating the fillet from the spine in the tail region by cutting through the ligament around the spine left by the ventral and dorsal knives, an endless conveyor for transporting the fish tail-first as well as a number of transport saddles arranged on the conveyor as supporting bodies for securely receiving the fish in their abdominal cavities.

Such apparatuses and machines are used in the fish processing industry to automatically fillet fish, particularly of the salmon species. An essential work step during automatic filleting of the fish is releasing the fillets from the flank bones, that is the rib cages which extend on both sides of the central bone. To release the fillets from the flank bones, the fish are transported, by means of the transport saddles as supporting bodies for securely receiving the fish in their abdominal cavities, to the individual processing stations, inter alia also the apparatus for cutting free the flank bones. The bone guides above and below the fish are used to hold and guide the fish in the optimum processing position on the transport saddle. The cutting gap is formed between the cutting edges of the separating means and the counter-surface.

Such an apparatus for cutting free flank bones is disclosed, for example, in WO 2009/059759 A1 filed by the company of the applicant. In connection with the present invention, reference will be made explicitly to the WO specification which explains in detail the basic construction and mode of operation of a generic apparatus for cutting free the flank bones and of a filleting machine and the disclosure of which is intended to become part of this application.

The flank bones do not extend or reach completely around the abdominal cavity. This means that, after decapitating and slaughtering of the fish and opening of the abdominal cavity, one fish fillet extends on either side of the central bone, said fillet resting on the flank bones and being joined thereto. The flank bones, however, do not extend right up to the free ends of the fish fillets. In other words, the fillets extend with their belly flaps hanging down beyond the flank bones. The belly flaps or belly strips located at the lower, free end of the fish fillets are also referred to as white belly skin or fat strips.

When cutting free the flank bones, the separating means inserts into the fish approximately in the region of the free ends of said flank bones such that, on being transported through the separating means, the fillets are released from the flank bones up to the top of the central bone. Virtually the pure fillet is released while the belly flap/fat strip remains on the free ends of the flank bones. It has been shown, however, that users of such apparatuses and filleting machines would also like to harvest fillets with the belly flaps/fat strips or parts thereof.

In such cases, the separating means can be partially covered in the region of the cutting edges by means of a covering element, in such a manner that the position of the incision into the fish by the separating means is changed by means of the covering element acting as a belly flap deflector. In other words, the covering element changes the position or situation of the effective region of the separating means in respect of the fish. In the known apparatuses and filleting machines, the covering element is screwed tight. In other words, the covering element is set to a defined setting which corresponds to a certain width of the fat strip for a specific product or a specific product size. In the event of a product change and/or a desired change in the width of the fat strip, the covering element must be unscrewed manually during the machine downtime, adjusted to the new position and fixed again. This usually involves opening the housing of the machine. The known solution is thus time-consuming and complex. In addition, production has to be interrupted for the adjustment work.

Thus, the object of the invention is to propose an individually usable and easy to handle apparatus for cutting free the flank bones. The object is additionally to create a corresponding filleting machine.

This object is achieved by an apparatus of the type referred to hereinbefore in that a covering element for covering regions of the cutting edge of the separating means located in the effective region of the separating means inside the fish, is assigned to the separating means, and the covering element is designed and configured to be automatically adjustable with respect to its position in relation to the separating means. The effective region of the separating means describes the region in which the separating means impinges on or into the fish and cuts it. This means that the effective region of the cutting edge, that is the region with which the flank bones are cut free, can be changed with the automatically adjustable covering element. In this context, the term "automatically" means that the adjustment can be made from the outside, that is without intervention in the apparatus. With the embodiment according to the invention, a simple and safe adjustment option is created with which an adaptation of the position of the covering element in respect of the separating means can be made from the outside, virtually online, optionally by an operator who, for example, actuates proportional valves, or fully automatically, e.g. by controlling via previously determined information in relation to the fish to be processed, in order to obtain different end products, namely, for example, pure fillet without white belly skin, fillet with a maximum width strip of white belly skin or fillet with a narrow strip of white belly skin. Due to the adjustability of the covering element, it is possible to respond quickly to a product changeover without intervention in the filleting machine, that is when the machine is running, such that the apparatus for cutting free is easy to handle and individually usable.

Advantageously, the separating means comprises two circular knives with corresponding counter-surface, wherein the two circular knives and the associated counter-surface are arranged on opposing sides of the fish to be processed, and the circular knives are each rotatably drivable about a rotary axis $D_1$, $D_2$, wherein a covering element is assigned to each circular knife, said covering element being automatically movable from a position in which the region of the cutting edge of the circular knife located in the effective region of the circular knife inside the fish is completely exposed, into a position in which the region of the cutting edge of the circular knife located in the effective region of the circular knife inside the fish is at least partially covered, and back again. In the case where the covering element completely exposes the effective region of the circular knife, the pure fillet is obtained without white belly skin. As soon as the covering element covers the effective region of the circular knife even if only partially, a fillet is obtained with white belly skin. The size/width of the strip of white belly skin on the fillet can be changed depending on the extent of the coverage. For or when covering, the covering element protrudes beyond the cutting edge of the circular knife such that cutting is prevented in the covered region. Thus the effective and free cutting edge impinges on the fish at a different position which leads to the changed cutting result.

An expedient development of the invention is characterised in that the covering element is a pivot element with its side directed towards the circular knife being flat and running parallel to said circular knife, said pivot element being designed and configured to be pivotable about pivot axes $S_1$ and $S_2$ and freely and continuously movable between the end positions. An especially easy and compact adjustment of the covering element can thus be implemented with short adjustment paths and correspondingly short response times. It is possible to quickly and precisely change the active effective region of the circular knives by means of a simple pivoting movement about the pivot axes $S_1$ and $S_2$.

A preferred embodiment is characterised in that the rotary axes $D_1$, $D_2$ of the circular knives on the one hand and the pivot axes $S_1$, $S_2$ of the covering elements assigned to said circular knives on the other hand correspond to each other, that is $D_1=S_1$ and $D_2=S_2$. In other words, the circular knife and the associated covering element each rotate or pivot about the same axis which facilitates a particularly compact and precise adjustment.

Expediently, each covering element is supported by means of a flanged connection or similar on an axle having the pivot axis $S_1$ and $S_2$ respectively and is pivotable by means of a mechanically and/or pneumatically controllable actuating mechanism. The flanged connection or similar expresses that any covering element with a customary design can be arranged at or on the axle. Using the actuating mechanism, the adjustment can be implemented especially easily and compactly from the outside.

One development is characterised in that the actuating mechanism comprises a mechanical spring and a pneumatic cylinder. This embodiment supports the advantages mentioned previously.

A preferred embodiment provides that the spring has a linear spring constant and the pneumatic cylinder is designed and configured to be adjustable with respect to its cylinder force. Using the spring, the covering element can be held in an end position in a simple manner while the pneumatic cylinder ensures continuously variable adjustment against the spring force of the spring. This ensures especially easy handling which in particular facilitates adjustment from the outside.

Advantageously, the actuating mechanism can comprise two springs, wherein one spring has a spring constant and the other spring has an adjustable spring force. The second spring adjustable from the outside proposes an alternative adjustment option by means of which the advantages mentioned previously can also be achieved.

The object is also achieved by a filleting machine of the type referred to hereinbefore in that the apparatus for cutting free the flank bones is designed and configured according to any one of claims 1 to 8. The advantages arising from this have already been described in connection with the apparatus for cutting free the flank bones, which is why reference will be made to the relevant passages to avoid repetitions.

An especially preferred embodiment of is characterised in that the filleting machine comprises a machine controller for controlling the knives, wherein the actuating mechanism for the covering elements is also controllable by means of the machine controller. This ensures coordinated adjustment of all the adjusting components.

Figure 2:
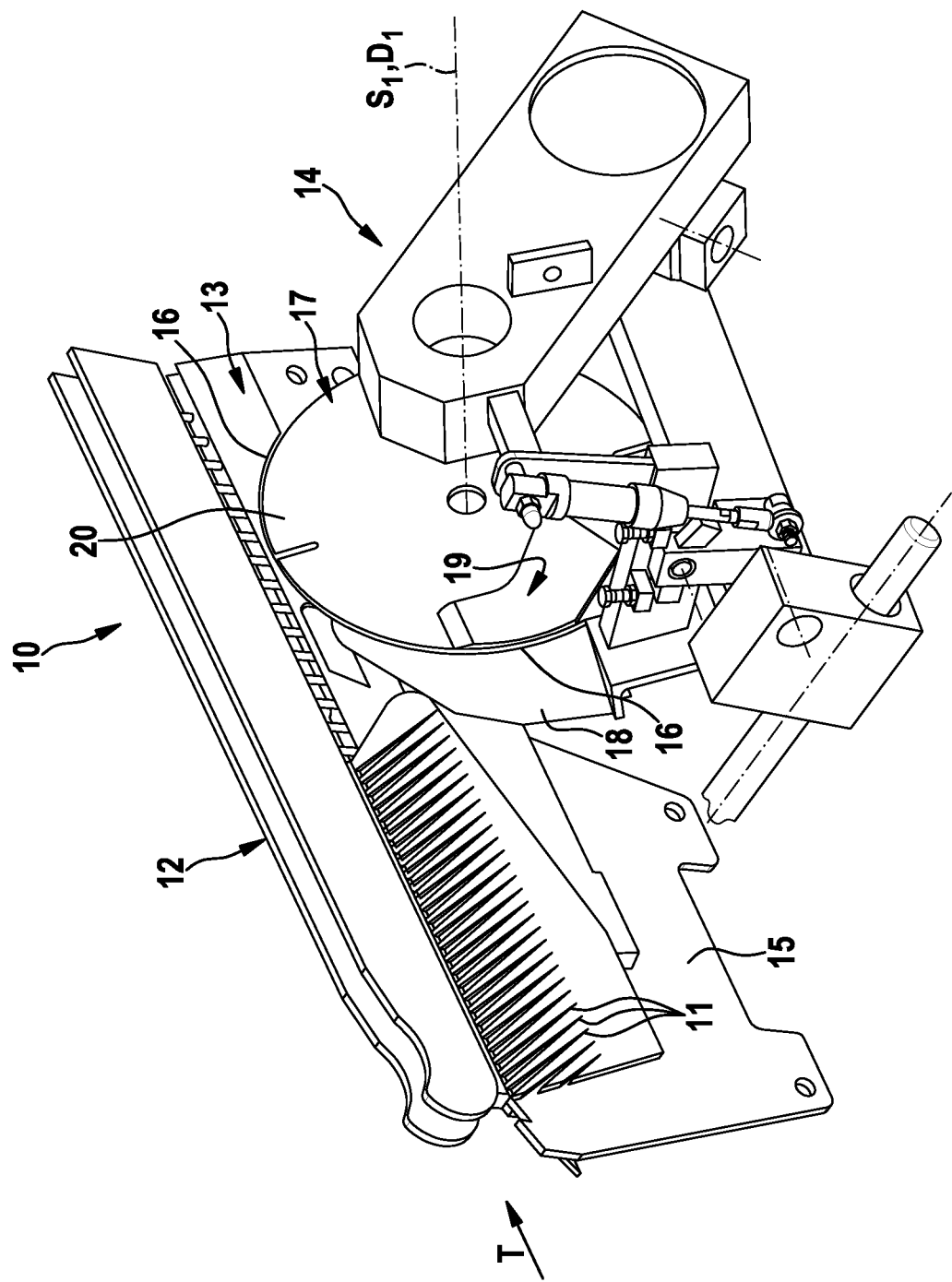
Figure 3:
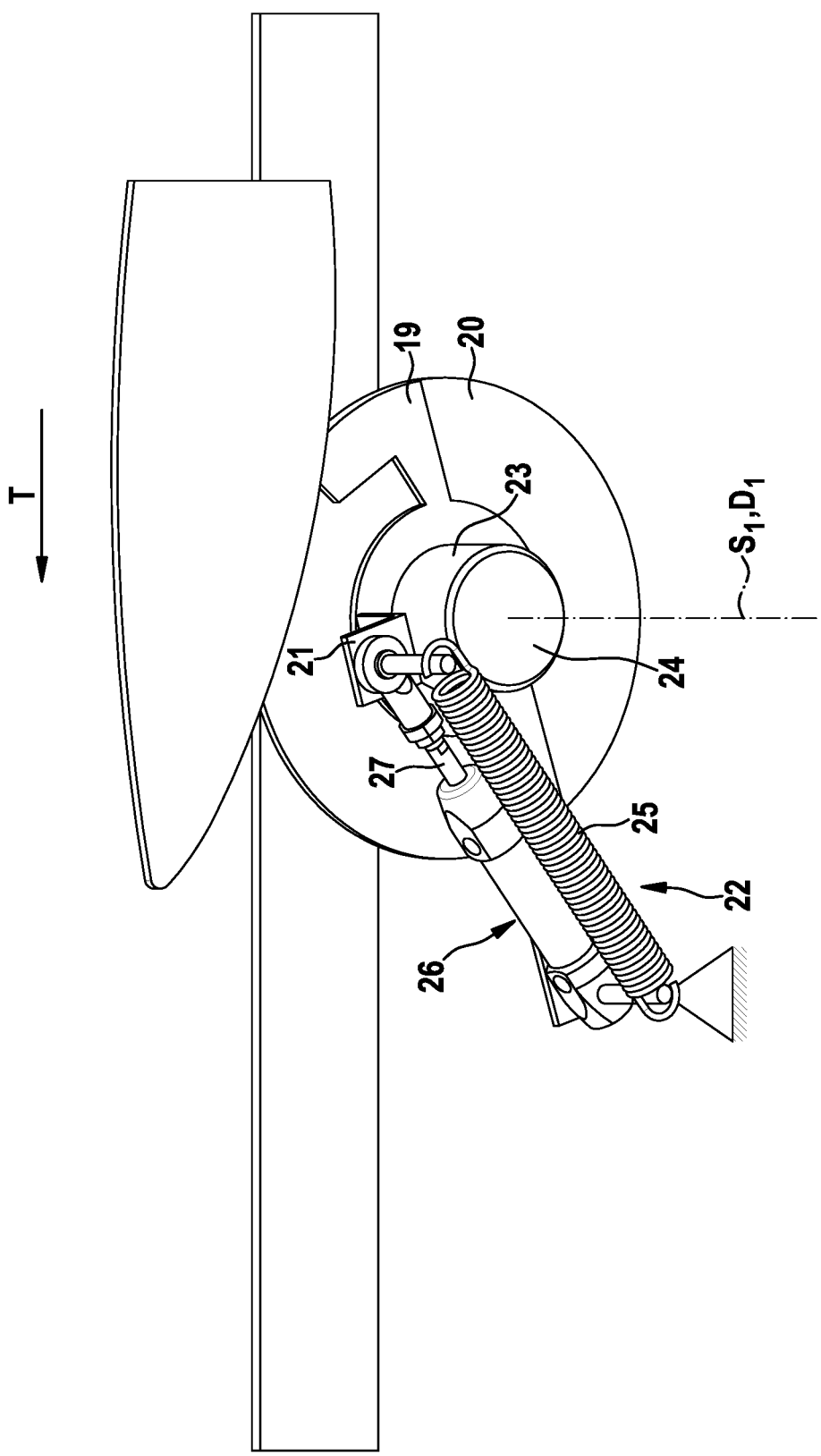

Further expedient and/or advantageous features and developments of the invention emerge from the dependent claims and the description. An especially preferred embodiment of the invention is explained in greater detail with reference to the attached drawing. The drawing shows:

FIG. 1 a perspective view of an apparatus according to the invention in a state in which a fish impinges on the circular knives, with a covering element in the retracted position completely exposing the effective region of the circular knives, FIG. 2 a perspective view of an apparatus according to the invention in a state in which a fish impinges on the circular knives, with a covering element in a position partially covering the effective region of the circular knives, FIG. 3 a schematic representation of a circular knife with associated covering element and an associated actuating mechanism.

The apparatus illustrated in the drawing is used for cutting free the flank bones of decapitated, slaughtered salmon with opened abdominal cavities which are transported tail-first in the direction of fish travel. The apparatus, however, can also be used, of course, to release the fillets from flank bones of other fish species. It is also possible to use it for fish that are transported head-first in the direction of fish travel. The described apparatus can be used as a single component or as an integral part of a filleting machine.

With the apparatus 10 illustrated in FIGS. 1 and 2 for cutting free the flank bones 11, only the processing of one side of the fish is shown and described for the sake of better clarity. The apparatus 10 can also be limited thereto. Preferably, however, synchronous processing of both sides of the fish takes place by means of opposing and corresponding components of the apparatus 10. The two fillets of a fish are preferably cut free from the flank bones 11 simultaneously, but also optionally time-delayed. Alternatively, apparatuses 10 arranged on opposing sides of a fish can also form one common apparatus, wherein the processing can take place on both sides synchronously or independently of each other. For better clarity, the fillets themselves were not illustrated to enable a view of the structural components of the apparatus 10.

The apparatus 10 comprises an upper bone guide 12, a lower bone guide 13 and a separating assembly 14 for releasing fish fillets from the flank bones 11. By means of the bone guides 12, 13, the fish to be processed, which is usually transported into the region of the separating assembly 14 on a transport saddle 15 as a supporting body, is held in a defined position in such a manner that the fish lies in a defined position in respect of the separating assembly 14. The separating assembly 14, which can be brought from a standby position into a working position and vice versa, comprises a separating means 17 having cutting edges 16 with corresponding counter-surface 18. In the standby position, the separating means 17 is prevented from engaging with the fish. In the working position, the separating means 17 is positioned for engaging with the fish. For this the separating assembly 14 and/or each separating means 17 with corresponding counter-surface 18 has at least one degree of freedom, preferably, however, several degrees of freedom.

This apparatus 10 is characterised according to the invention in that a covering element 19 for covering regions of the cutting edge 16 of the separating means 17 located in the effective region of the separating means 17 inside the fish, is assigned to the separating means 17, and the covering element 19 is designed and configured to be automatically adjustable with respect to its position in relation to the separating means 17. The covering element 19 can be adjusted in relation to the separating means 17 from the outside in order to cover, as required, sometimes more or sometimes less of the cutting edge 16 so as to change the incision or to achieve different cutting results, namely, for example, pure fillets, fillets with a narrow strip of white belly skin or fillets with a maximum width strip of white belly skin. To do this, for example, an operator can activate operating elements, for example in the form of proportional valves, which result in the automatic adjustment of the covering element 19. The adjustment can also take place fully automatically in that the covering element 19 is controlled on the basis of previously determined information relating to the fish to be processed.

When taken on their own or in combination with each other, the features and developments described below illustrate preferred embodiments. It is expressly pointed out that features which are summarised in the claims and/or the description or are described in a common embodiment can also further develop the apparatus 10 described above in a functionally independent manner.

The separating means 17 preferably comprises two circular knives 20 with corresponding counter-surface 18. The two circular knives 20 and the associated counter-surface 18 are arranged on opposing sides of the fish to be processed. The circular knives 20 are each rotatably drivable about a rotary axis $D_1$, $D_2$, that is with variable speed by means of drives not illustrated. The counter-surfaces 18 are arranged upstream of the circular knife 20 in the direction of fish travel T. Circular knife 20 and counter-surface 18 are preferably movable jointly from the standby position into the working position and back. A covering element 19 is assigned to each circular knife 20, said covering element being automatically movable from a position in which the region of the cutting edge 16 of the circular knife 20 located in the effective region of the circular knife 20 inside the fish is completely exposed (see e.g. FIG. 1), into a position in which the region of the cutting edge of the circular knife 20 located in the effective region of the circular knife inside the fish is at least partially covered (see e.g. FIG. 2), and back again. The covering element 19 has limit stops to form two end positions in order to limit the movement of the covering element 19.

The covering element 19 is preferably a pivot element with its side directed towards the circular knife 20 being flat and running parallel to said circular knife 20, said pivot element being designed and configured to be pivotable about pivot axes $S_1$ and $S_2$ and freely and continuously movable between the end positions. The plate-shaped covering element 19 is, for example, a flat, spatula- or finger-shaped steel body, the outer contour of which describes a radius which approximately corresponds to the radius of the circular knife 20. The planes spanned by the circular knife 20 and the flat side of the covering element 19 run essentially parallel. By pivoting the covering element 19 about the pivot axes $S_1$, $S_2$, the covering element 19 in the embodiment according to FIGS. 1 and 2 moves in the clockwise direction relative to the circular knife 20 to progressively cover the cutting edges 16. The covering element 19 moves in the counter-clockwise direction to progressively expose the cutting edges 16. The covering elements 19 can also have a different shape and assignment to the circular knife 20 and, for example, can also be linearly movable or displaceable. The direction of rotation of the covering element 19 for covering and exposing the cutting edges 16 can also be reversed in other embodiments, e.g. according to FIG. 3.

In the embodiment illustrated, the rotary axes $D_1$, $D_2$ of the circular knives 20 on the one hand and the pivot axes $S_1$, $S_2$ of the covering elements 19 assigned to said circular knives 20 on the other hand correspond to each other. The rotary axis $D_1$ thus corresponds to the pivot axis $S_1$ in that $D_1$ and $S_1$ have the same orientation and are aligned flush with each other. The same applies to the rotary axis $D_2$ and the pivot axis $S_2$. However, the rotary axes $D_1$, $D_2$ can also be offset, inclined or be otherwise aligned differently from the respectively assigned pivot axes $S_1$, $S_2$. For illustrative reasons, the axes $S_2$ and $D_2$ are not named in the Figures.

Each covering element 19 is supported by means of a flanged connection 21 or similar on an axle having the pivot axis $S_1$ and $S_2$ respectively and is pivotable by means of a mechanically and/or pneumatically controllable actuating mechanism 22. In other words, the covering element 19 is rotatably mounted, that is independently of the circular knife 20, and adjustable in relation thereto. This can be implemented, for example, by means of a tubular sleeve 23 as part of the flanged connection 21, wherein the sleeve 23 is supported on the drive axle/drive shaft 24 of the circular knife 20. Via the actuating mechanism 22, the covering element 19 is then continuously and automatically adjustable in relation to the circular knife 20. In the embodiment shown, adjustment of the covering 19 takes place exclusively about the pivot axis $S_1$, $S_2$. In other embodiments, radial adjustment or combined adjustment can also be implemented.

The actuating mechanism 22 preferably comprises a mechanical spring 25 and a pneumatic cylinder 26 (see e.g. FIG. 3). For the sake of simplicity and better clarity, the supply connections for the pneumatic cylinder 26 are not illustrated. The spring 25 has a linear spring constant and is attached with one end to the flanged connection 21 and with the other end to a housing wall, not illustrated, or to another fixed pivot point, for example the fixing point of the pneumatic cylinder 26 itself (see e.g. FIG. 3). The pneumatic cylinder 26 is designed and configured to be adjustable with respect to its cylinder force. The piston 27 of the pneumatic cylinder 26 is attached to the flanged connection 21. The pressure of the pneumatic cylinder 26 is variably adjustable and is balanced using the spring force of the spring 25 until the desired position of the covering element 19, which can also be referred to as a belly flap deflector, is achieved. Optionally, the pneumatic cylinder 26 can also be replaced by a second spring which then has a spring force adjustable from the outside.

As mentioned above, the circular knives 20 and the counter-surfaces 18 are designed to be adjustable. The circular knives 20 and the counter-surfaces 18 are preferably pivotable about two axes, so as to be movable from the standby position into the working position and back on the one hand and to execute the necessary cutting movements on the other hand. The separating assembly 14 preferably has a total of four degrees of freedom, namely about the pivot axes I, II, III and IV. Above the pivot axis I, the circular knife 20 and the counter-surface 18 are movable up and down in respect of the transport plane of the fish. About the pivot axis II, the circular knife 20 is movable towards the bone guides 12, 13 and away therefrom. About the pivot axes III and IV, the counter-surface 18 is movable towards the bone guides 12, 13 and away therefrom. All the movements can be overlapped with each other.

As mentioned, the apparatus 10 can also be used as a stand-alone apparatus. Preferably, however, the apparatus 10 is an integral part of a filleting machine for filleting decapitated, slaughtered fish with opened abdominal cavities, comprising dorsal knives for exposing the dorsal spokes up to the spine, ventral knives for exposing the ventral spokes up to the spine in the tail region, an apparatus 10 for cutting free the flank bones, separating knives for separating the fillet from the spine in the tail region by cutting through the web around the spine left by the ventral and dorsal knives, an endless conveyor for transporting the fish tail-first as well as a number of transport saddles 15 arranged on the conveyor as supporting bodies for securely receiving the fish in their abdominal cavities.

The filleting machine can further comprise a machine controller by means of which at least all the knives are controllable. Optionally, the actuating mechanism 22 for the covering element 19 is connected to the machine controller such that said covering element 19 is also controllable by means of said machine controller.

The invention claimed is:

1. An apparatus for cutting free the flank bones of decapitated, slaughtered fish with opened abdominal cavities which are transported on transport saddles as supporting bodies for securely receiving the fish in their abdominal cavities, comprising an upper bone guide, a lower bone guide and a separating assembly for releasing fish fillets from the flank bones, wherein the separating assembly, which can be brought from a standby position into a working position and vice versa, comprises a fish fillet from fish flank bones separating means having at least one cutting edge and having a corresponding counter-surface, characterised in that a covering element, for covering regions of the at least one cutting edge of the separating means located in an effective region of the fish fillet from fish flank bones separating means inside the fish, is assigned to the separating means, and the covering element is designed and configured such that the covering element can be automatically adjusted with respect to the position of the covering element in relation to the fish fillet from fish flank bones separating means.

2. The apparatus according to claim 1, characterised in that the fish fillet from fish flank bones separating means comprises two circular knives and with a corresponding counter-surface, wherein the two circular knives and the associated counter-surface are arranged on opposing sides of the fish to be processed, and the circular knives are each rotatably drivable about a rotary axis $D_1$, $D_2$, wherein a covering element is assigned to each circular knife, said covering element being automatically movable from a position in which the region of the cutting edge of the circular knife located in the effective region of the circular knife inside the fish is completely exposed, into a position in which the region of the cutting edge of the circular knife located in the effective region of the circular knife inside the fish is at least partially covered, and back again.

3. The apparatus according to claim 1, characterised in that the covering element is a pivot element with a side of the pivot element being directed towards the circular knife being flat and running parallel to said circular knife, said pivot element being designed and configured to be pivotable about pivot axes $S_1$ and $S_2$ and freely and continuously movable between end positions of the pivot element.

4. The apparatus according to claim 3, characterised in that the rotary axes $D_1$, $D_2$ of the circular knives on the one hand and the pivot axes $S_1$, $S_2$ of the covering elements assigned to said circular knives on the other hand correspond to each other, that is $D_1=S_1$ and $D_2=S_2$.

5. The apparatus according to claim 1, characterised in that the covering element is supported by a flanged connection or similar on an axle having the pivot axis $S_1$ and $S_2$ respectively and is pivotable by functional engagement with a controllable actuating mechanism.

6. The apparatus according to claim 5, characterised in that the actuating mechanism comprises a mechanical spring and a pneumatic cylinder.

7. The apparatus according to claim 6, characterised in that the spring has a linear spring constant and the pneumatic cylinder is designed and configured to be adjustable with respect to a cylinder force corresponding to the pneumatic cylinder.

8. The apparatus according to claim 5, characterised in that the actuating mechanism comprises two springs, wherein one spring has a spring constant and the other spring has an adjustable spring force.

9. A filleting machine for filleting decapitated, slaughtered fish with opened abdominal cavities, comprising dorsal knives for exposing the dorsal spokes up to the spine, ventral knives for exposing the ventral spokes up to the spine in the tail region, an apparatus for cutting free the flank bones, separating knives for separating the fillet from the spine in the tail region by cutting through the ligament around the spine left by the ventral and dorsal knives, an endless conveyor for transporting the fish tail-first as well as a number of transport saddles arranged on the conveyor as supporting bodies for securely receiving the fish in their abdominal cavities, characterised in that the apparatus for cutting free the flank bones is designed and configured according to claim 1.

10. The filleting machine according to claim 9, characterised in that the filleting machine comprises a machine controller for controlling the knives, wherein an actuating mechanism for the covering elements is also controllable by the machine controller.

* * * * *